United States Patent
Zou et al.

(10) Patent No.: US 9,544,218 B2
(45) Date of Patent: Jan. 10, 2017

(54) PROCESSING NICKNAME CONFLICT IN TRILL NETWORK

(71) Applicant: Hangzhou H3C Technologies Co., Ltd., Hangzhou (CN)

(72) Inventors: Wenyu Zou, Beijing (CN); Jin Qu, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/764,504

(22) PCT Filed: Jan. 26, 2014

(86) PCT No.: PCT/CN2014/071448
§ 371 (c)(1),
(2) Date: Jul. 29, 2015

(87) PCT Pub. No.: WO2014/121702
PCT Pub. Date: Aug. 14, 2014

(65) Prior Publication Data
US 2015/0365315 A1    Dec. 17, 2015

(30) Foreign Application Priority Data

Feb. 7, 2013    (CN) .......................... 2013 1 0049116

(51) Int. Cl.
*H04L 12/751* (2013.01)
*H04L 12/703* (2013.01)
*H04L 12/939* (2013.01)

(52) U.S. Cl.
CPC ............... *H04L 45/02* (2013.01); *H04L 45/28* (2013.01); *H04L 49/557* (2013.01)

(58) Field of Classification Search
CPC .......... H04L 45/66; H04L 45/12; H04L 45/48; H04L 49/65; H04L 49/201; H04L 12/28; H04L 45/18; H04L 45/16; H04L 45/00; H04L 45/24; H04L 45/50; H04L 45/74; H04L 45/745; H04L 12/66; H04L 12/4633; H04L 41/12; H04L 41/0803; H04L 47/10; H04L 47/12
See application file for complete search history.

(56) References Cited

U.S. PATENT DOCUMENTS

2012/0044944 A1*  2/2012  Kotha .................. H04L 41/12
                                                      370/401
2012/0320800 A1* 12/2012  Kamble ................ H04L 45/66
                                                      370/255

(Continued)

FOREIGN PATENT DOCUMENTS

CN          101977123         2/2011
CN          102123091         7/2011
WO     WO 2012171462 A1 * 12/2012 ........... H04L 12/462

OTHER PUBLICATIONS

RFC 6325 "Routing Bridges (RBridges): Base Protocol Specification"; Jul. 2011; Perlman et al.*

(Continued)

*Primary Examiner* — Benjamin H Elliott, IV
(74) *Attorney, Agent, or Firm* — Hewlett Packard Enterprise Patent Department

(57) ABSTRACT

A first routing bridge (RB) according to an example determines whether there is a nickname conflict between nicknames of the first RB and a second RB. If there is a nickname conflict, the first RB determines whether it is a lower priority RB and may modify its nickname if it is lower priority and based on a broadcast of link state packet from the second RB.

12 Claims, 3 Drawing Sheets

(56) References Cited

U.S. PATENT DOCUMENTS

| | | | | |
|---|---|---|---|---|
| 2014/0098703 A1* | 4/2014 | Bond | ............... | H04L 45/028 370/254 |
| 2014/0146822 A1* | 5/2014 | Janardhanan | ....... | H04L 12/4625 370/395.53 |
| 2015/0365315 A1* | 12/2015 | Zou | ............... | H04L 45/02 370/254 |
| 2016/0173362 A1* | 6/2016 | Qu | ............... | H04L 45/026 370/401 |

OTHER PUBLICATIONS

RFC 6326 "Transparent Interconnection of Lots of Links (TRILL) Use of IS-IS"; Jul. 2011; Eastlake et al.*

Corrected version of the Written Opinion dated Jun. 18, 2014 issued on PCT Patent Application No. PCT/CN2014/071448 dated Jan. 26, 2014, The State Intellectual Property Office, P.R. China.

International Search Report and Written Opinion dated Apr. 28, 2014 issued on PCT Patent Application No. PCT/CN2014/071448 dated Jan. 26, 2014, State Intellectual Property Office of The P.R. China.

* cited by examiner

PROCESSING NICKNAME CONFLICT IN TRILL NETWORK

CLAIM FOR PRIORITY

The present application is a national stage filing under 35 U.S.C.§371 of PCT application number PCT/CN2014/071448, having an international filing date of Jan. 26, 2014, which claims priority to Chinese patent application number 201310049116.X, having a filing date of Feb. 7, 2013, the disclosures of which are hereby incorporated by reference in their entireties.

BACKGROUND

Transparent Interconnection of Lots of Links (TRILL) is a Layer 2 (L2) network standard recommended by Internet Engineering Task Force (IETF), and may make up for the lack of Spanning Tree Protocol (STP) in a large data center.

In a TRILL network, a device running TRILL protocol is called a Routing Bridge (RB), and each RB has a unique nickname. The first RB that a unicast frame encounters in a campus in the TRILL network encapsulates the frame with a TRILL header that specifies the last RB where the frame is decapsulated. To save room in the TRILL header and simplify forwarding lookups, a dynamic nickname acquisition protocol is run among the RBs to select 2-octet nicknames for RBs. The nicknames are used to specify the ingress and egress RBs in the TRILL header.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Figure 1:
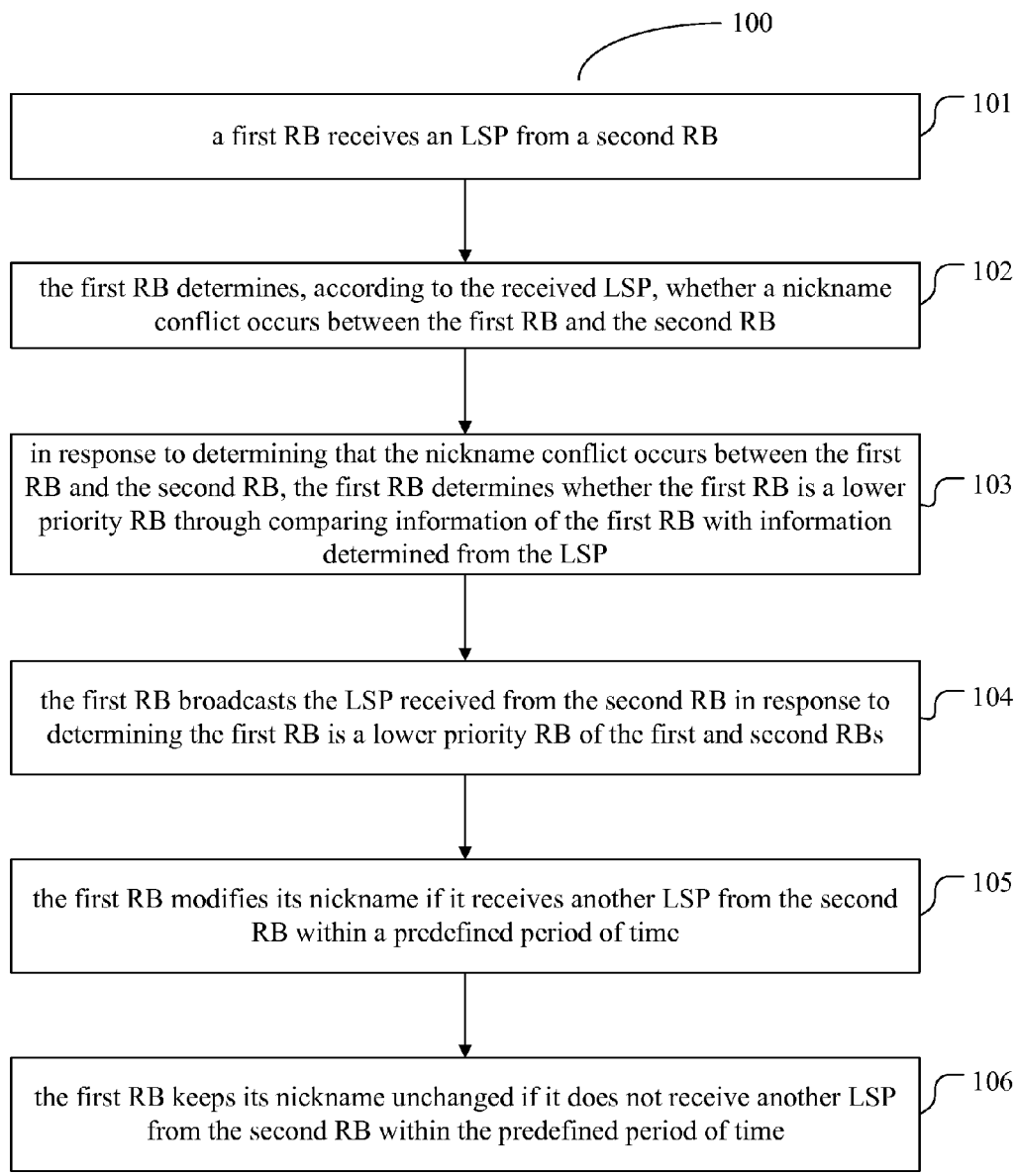
FIG. 1 is a flowchart illustrating a method for processing a nickname conflict in a TRILL network according to an example of the present disclosure.

FIG. 1 is a flowchart illustrating a method 100 for processing a nickname conflict in a TRILL network according to an example of the present disclosure.

At block 101, a first RB receives a link state packet (LSP) from a second RB.

At block 102, the first RB determines, according to the received LSP, whether a nickname conflict occurs between the first RB and the second RB. The LSP for example includes the nickname of the second RB. A conflict occurs for example if the first RB and the second RB have the same nickname.

At block 103, in response to determining that the nickname conflict occurs between the first RB and the second RB, the first RB determines whether the first RB is a lower priority RB through comparing information of the first RB with information contained in the LSP. Examples of determining a lower priority RB are described below.

At block 104, the first RB broadcasts the LSP received from the second RB in response to determining the first RB is a lower priority RB of the first and second RBs.

At block 105, the first RB modifies its nickname if it receives another LSP from the second RB within a predefined period of time.

At block 106, the first RB keeps its nickname unchanged if it does not receive another LSP from the second RB within the predefined period of time.

In an example, the process for determining whether the first RB is the lower priority RB through comparing the information of the first RB with the information contained in the LSP may be implemented as follows. The first RB determines priorities of the first RB and the second RB. The priority is the priority of the nickname. For example, priorities may be assigned by a system administrator or machine. A priority may be adjusted over time. For example, an RB may increase its nickname priority after holding the same nickname for a period of time. The nicknames and their priorities may be distributed through a dynamic nickname acquisition protocol. The TRILL protocol specifies that the nickname selection protocol may be piggybacked on TRILL IS-IS using an IS-IS TLV (type-length-value data element) along with a priority of use value, which specifies the priority of the nickname. An RB that has been configured with one or more nickname values may have a higher priority for those nickname values over all RBs with non-configured nicknames.

The first RB receives the LSP of the second RB and determines the priority of the second RB, which may be stored by the first RB along with the nickname of the second RB. The first RB compares the priorities of the first and second RBs to determine which one is higher. In one example, a predetermined scale of priorities (e.g., in a simplistic example, the scale is low, medium, high) may be known to the RBs and used to prioritize the RBs, so the first RB can determine which RB has a higher priority on the scale. Also, if the first RB determines that it has a lower priority on the scale than the second RB, the first RB determines that it is a loser (i.e., the lower priority RB of the first RB and the second RB) which may invoke other operations to resolve nickname conflict and network instability. For example, the nickname of the first RB may be changed.

The first RB and the second RB may have the same priority. For example, the first RB determines the priorities of the first and second RB and determines the priorities are the same. In response to determining the priority of the first RB is the same as the priority of the second RB, the first RB determines whether a system identity of the first RB is smaller (e.g., lower) than a system identity of the second RB contained in the LSP. The system ID for example is the unique IS-IS system ID (e.g., six-octet) of an RB in a campus in the TRILL network. The nickname is provided for the system ID. In response to determining the system identity of the first RB is smaller than the system identity of the second RB, the first RB determines that it is the lower priority RB.

Figure 2:
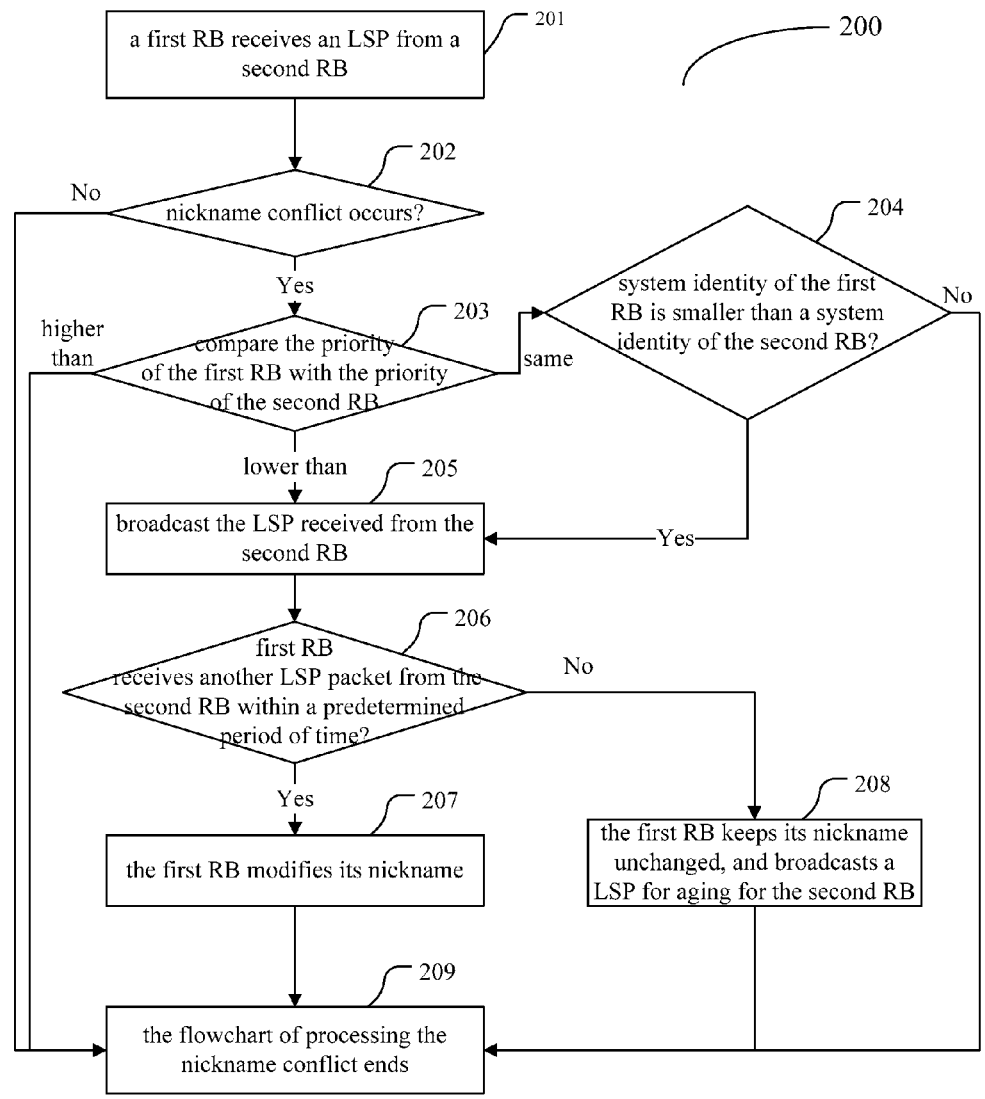
FIG. 2 is a flowchart illustrating a method for processing a nickname conflict in a TRILL network according to another example of the present disclosure.

FIG. 2 is a flowchart illustrating a method 200 for processing a nickname conflict in a TRILL network according to another example of the present disclosure.

At block 201, a first RB receives an LSP from a second RB.

For example, each of the RBs in the TRILL network periodically sends an LSP, so as to provide topology information. Any RB receiving the LSP updates its Link State Data Base (LSDB) with information in the received LSP, and checks whether a nickname conflict occurs.

At block 202, the first RB determines, according to the received LSP, whether a nickname conflict occurs between the first RB and the second RB. In response to determining the nickname conflict occurs between the first RB and the second RB, block 203 is performed. If the nickname conflict does not occur between the first RB and the second RB, block 209 is performed.

In an example, the process for determining, according to the received LSP, whether the nickname conflict occurs between the first RB and the second RB may be implemented as follows. If the nickname of the second RB contained in the LSP is the same as the nickname of the first RB, the first RB determines that the nickname conflict occurs. If the nickname of the second RB contained in the LSP is different from the nickname of the first RB, the first RB determines that no nickname conflict occurs.

At block 203, the first RB compares the priority of the first RB with the priority of the second RB. In response to determining the priority of the first RB is lower than the priority of the second RB, block 205 is performed. In response to determining the priority of the first RB is the same as the priority of the second RB, block 204 is performed. In response to determining the priority of the first RB is higher than the priority of the second RB, block 209 is performed.

The priority refers to priority of the nickname of the RB.

At block 204, the first RB determines whether a system identity of the first RB is smaller than a system identity of the second RB. In response to determining the system identity of the first RB is smaller than the system identity of the second RB, block 205 is performed. In response to determining the system identity of the first RB is not smaller than a system identity of the second RB, block 209 is performed.

At block 205, the first RB broadcasts the LSP received from the second RB.

If the priority of the first RB is lower than the priority of the second RB, or the priority of the first RB is the same as the priority of the second RB and the system identity of the first RB is smaller than the system identity of the second RB, the first RB determines whether the second RB is in the same TRILL network or the same campus as the first RB in the TRILL network. In response to determining the second RB is in the TRILL network or campus, the first RB modifies its nickname.

For example, the first RB adds 1 to a sequence number of the LSP received from the second RB at block 201, and broadcasts the modified LSP of the second RB. In response to the first RB broadcasting the modified LSP, the first RB records the sequence number of the broadcasted LSP.

At block 206, the first RB determines whether the first RB receives another LSP from the second RB within a predetermined period of time. In response to determining the first RB receives another LSP from the second RB within the predetermined period of time, block 207 is performed. In response to determining the first RB does not receive another LSP from the second RB within a predetermined period of time, block 208 is performed.

In an implementation, if the second RB receives its own LSP and the sequence number of the received LSP is larger than the sequence number of the previously sent LSP, the second RB immediately broadcasts an LSP. The sequence number of the broadcasted LSP is larger than the sequence number of the received LSP.

And thus, after the first RB broadcasts the modified LSP of the second RB, the second RB immediately broadcasts another LSP if the second RB is still in the TRILL network. Accordingly, if the first RB receives another LSP from the second RB within the predefined period of time after broadcasting the modified LSP of the second RB, it is indicated that the second RB is still in the TRILL network.

If the first RB receives another LSP from the second RB within the predefined period of time after broadcasting the modified LSP of the second RB, the first RB determines whether the sequence number of the received another LSP is larger than the sequence number of the broadcasted LSP, thereby accurately determining whether the second RB is still in the TRILL network.

At block 207, the first RB modifies its nickname.

If the first RB finds that the second RB is still in the TRILL network through broadcasting the modified LSP of the second RB, the first RB modifies its nickname, thereby solving the nickname conflict.

At block 208, the first RB keeps its nickname unchanged, and broadcasts an LSP for aging for the second RB.

If the first RB finds that the second RB is not in the TRILL network through broadcasting the modified LSP of the second RB, the first RB keeps its nickname unchanged. In order to make all RBs in the TRILL network accurately calculate routing information, the first RB sends the LSP for aging for the second RB, and thus each RB in the TRILL network removes the LSP of the second RB from the LSDB according to the LSP for aging. The live time of the LSP for aging is 0.

At block 209, the flowchart of processing the nickname conflict ends.

The foregoing describes the method for processing the nickname conflict in the TRILL network. A device for processing a nickname conflict in the TRILL network is illustrated with reference to an example.

Figure 3:
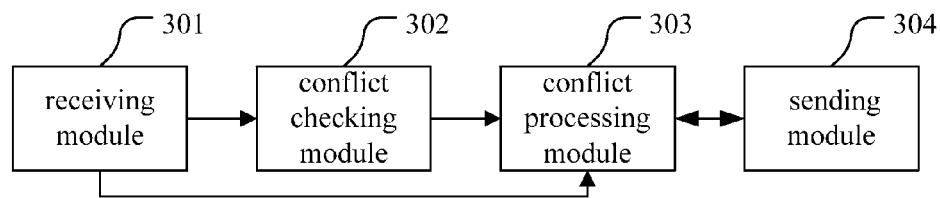
FIG. 3 is a diagram illustrating the structure of a device for processing a nickname conflict in a TRILL network according to an example of the present disclosure.

FIG. 3 is a diagram illustrating the structure of a device for processing a nickname conflict in a TRILL network according to an example of the present disclosure. The device may be applied to a RB, referred to as a first RB. The device includes a receiving module 301, a conflict checking module 302, a conflict processing module 303 and a sending module 304.

The receiving module 301 receives an LSP from a second RB.

The conflict checking module 302 determines, according to the LSP received by the receiving module 301, whether a nickname conflict occurs between the first RB and the second RB.

In response to the conflict checking module 302 determines that the nickname conflict occurs between the first RB and the second RB, the conflict processing module 303 determines whether the first RB is a lower priority RB through comparing information of the first RB with information contained in the LSP. In response to determining the first RB is a lower priority RB, the conflict processing module 303 notifies the sending module 304 to broadcast the LSP received from the second RB. In response to determining the receiving module 301 receives another LSP from the second RB within a predefined period of time, the conflict processing module 303 modifies the nickname of the first RB. If the receiving module 301 does not receive another LSP from the second RB within the predefined period of time, the conflict processing module 303 keeps the nickname of the first RB unchanged.

In an example, the conflict processing module 303 determines whether the priority of the first RB is lower than the priority of the second RB contained in the LSP. In response to determining the priority of the first RB is lower than the priority of the second RB, the conflict processing module 303 determines that the first RB is the lower priority RB.

In an example, the conflict processing module 303 is to determine whether the priority of the first RB is lower than the priority of the second RB contained in the LSP. In response to determining the priority of the first RB is the same as the priority of the second RB, the conflict processing module 303 is to determine whether a system identity of the first RB is smaller than a system identity of the second RB contained in the LSP. In response to determining the system identity of the first RB is smaller than the system identity of the second RB, the conflict processing module 303 is to determine that the first RB is the lower priority RB.

If the nickname of the second RB contained in the LSP received by the receiving module 301 is the same as the nickname of the first RB, the conflict checking module 302 is to determine that nickname conflict occurs. In response to determining the nickname of the second RB contained in the LSP received by the receiving module 301 is different from the nickname of the first RB, the conflict checking module 302 is to determine that no nickname conflict occurs.

After receiving the notification of the conflict processing module 303, the sending module 304 is to add 1 to a sequence number of the LSP received by the receiving module 301, and broadcast the modified LSP.

The sending module 304 is further to record the sequence number of the broadcasted LSP in response to broadcasting the modified LSP.

After the receiving module 301 receives another LSP from the second RB within the predefined period of time and before the conflict processing module 303 modifies the nickname of the first RB, the conflict processing module 303 determines whether the sequence number of another LSP received by the receiving module 301 within the predefined period of time is larger than the recorded sequence number. In response to determining the sequence number of another LSP received by the receiving module 301 within the predefined period of time is larger than the recorded sequence number, the conflict processing module 303 modifies the nickname of the first RB. In response to determining the sequence number of another LSP received by the receiving module 301 within the predefined period of time is not larger than the recorded sequence number, the conflict processing module 303 keeps the nickname of the first RB unchanged.

After keeping the nickname of the first RB unchanged, the conflict processing module 303 is further to notify the sending module 304 to broadcast an LSP for aging for the second RB. In this way, each of RBs in the TRILL network removes the LSP of the second RB from the LSDB.

Figure 4:
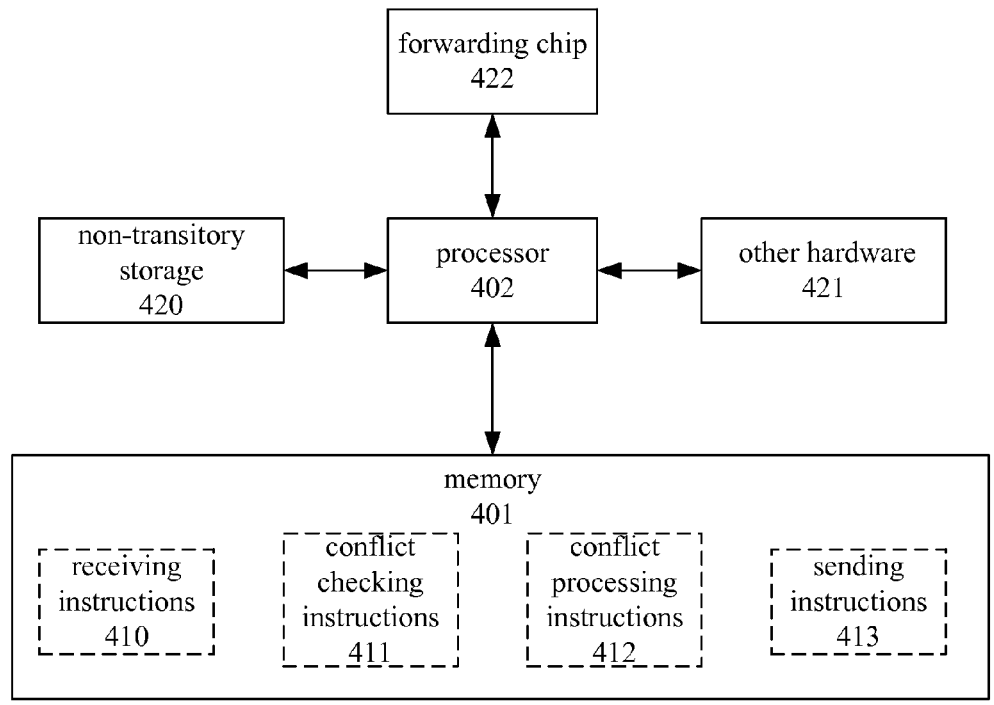
FIG. 4 is a diagram illustrating the structure of a device for processing a nickname conflict in a TRILL network according to another example of the present disclosure.

FIG. 4 is a diagram illustrating the structure of a device for processing a nickname conflict. The device may be a device in the network. The device may be a layer 2 network switch. The device may be an RB in a TRILL network, such as the first RB or the second RB described in the examples above. As shown in FIG. 4, the device at least includes a memory 401 and a processor 402 communicating with the memory 401. The memory 401 for example stores machine readable instructions that are executed to perform the method 100 and 200 and other functions described herein. The machine readable instructions for example include receiving instructions 410, conflict checking instructions 411, conflict processing instructions 412 and sending instructions 413 which can be executed by the processor 402. The instructions shown in FIG. 4 may embody the modules shown in FIG. 3. The memory 401 for example is a non-transitory computer storage readable medium. The device may include multiple storage mediums, including non-transitory storage 420, a forwarding chip 422 and other hardware 421.

The receiving instructions 410 are executed to receive LSPs from RBs.

The conflict checking instructions 411 determine, according to the received LSPs, whether any nickname conflict occurs between RBs. Examples of conflict checking are described in the methods above. The conflict processing instructions 412 determine RB priorities and determine whether a first RB has a lower priority than a second RB sending an LSP. Furthermore, the conflict processing instructions 412 can invoke and/or execute operations to rectify nickname conflicts such as described in the methods above. The sending instructions 413 send LSPs. For example, if the first RB is a loser (e.g., lower priority RB), he sending instruction 413 broadcast the LSP received from the second RB In another example, the sending instructions 413 to add 1 to a sequence number of the LSP received by the receiving instruction, and broadcast the modified LSP.

The sending instruction is further to record the sequence number of the broadcasted LSP in response to broadcasting the modified LSP.

After the receiving instruction receives another LSP from the second RB within the predefined period of time and before the conflict processing instruction modifies the nickname of the first RB, the conflict processing instruction is further to determine whether the sequence number of another LSP received by the receiving instruction within the predefined period of time is larger than the recorded sequence number. In response to determining the sequence number of another LSP received by the receiving instruction within the predefined period of time is larger than the recorded sequence number, the conflict processing instruction is to modify the nickname of the first RB. In response to determining the sequence number of another LSP received by the receiving instruction within the predefined period of time is larger than the recorded sequence number, the conflict processing instruction is to keep the nickname of the first RB unchanged.

After keeping the nickname of the first RB unchanged (i.e., not changing the nickname), the conflict processing instruction is further to notify the sending instruction to broadcast an LSP for aging for the second RB. In this way, each of RBs in the TRILL network removes the LSP of the second RB from the LSDB.

In the examples, in response to the first RB determines that the nickname conflict occurs between the first RB and the second RB, the first RB determines whether the second RB is still in the TRILL network through broadcasting the LSP received from the second RB. In response to determining the second RB is not in the TRILL network, the first RB keeps its nickname unchanged, thereby avoiding the temporary interruption of data traffic forwarding and the recalculation of large number of routing items, and further ensuring the stability of the TRILL network.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What is claimed is:

1. A method for processing a nickname conflict in a TRILL network, comprising:
    receiving, by a first Routing Bridge (RB), a Link State Packet (LSP) from a second RB;
    determining, according to the received LSP, whether nicknames for the first RB and the second RB conflict;
    in response to determining that the nicknames conflict, determining whether the first RB is a lower priority RB than the second RB based on comparing information of the first RB with information determined from the LSP;
    broadcasting the LSP received from the second RB in response to determining the first RB is the lower priority RB;
    modifying the nickname of the first RB if the first RB receives another LSP from the second RB within a predefined period of time of receiving the LSP; and
    keeping the nickname of the first RB unchanged if the first RB does not receive another LSP from the second RB within the predefined period of time.

2. The method of claim 1, wherein the determining of whether the first RB is the lower priority RB comprises:
    determining a priority of the first RB;
    determining a priority of the second RB based on the LSP;
    comparing the priorities of the first and second RBs; and
        determining the first RB is the lower priority RB if the priority of the first RB is determined to be lower than the priority of the second RB based on the comparing.

3. The method of claim 2, comprising:
    determining whether the priorities are the same based on the comparing;
    in response to determining the priorities are the same, determining whether a system identity of the first RB is smaller than a system identity of the second RB contained in the LSP; and
        if the system identity of the first RB is smaller than the system identity of the second RB, determining that the first RB is the lower priority RB.

4. The method of claim 1, wherein the determining of whether the nicknames for the first RB and the second RB conflict comprises:
    if the nickname of the second RB contained in the LSP is the same as the nickname of the first RB, determining that the nickname conflict occurs; otherwise, determining that no nickname conflict occurs.

5. The method of claim 4, wherein the broadcasting the LSP received from the second RB comprises:
    adding 1 to a sequence number of the LSP received from the second RB, and broadcasting the modified LSP of the second RB;
    in response to broadcasting the modified LSP of the second RB, the method further comprises:
        recording the sequence number of the broadcasted LSP;
        after receiving another LSP from the second RB within the predefined period of time and before modifying the nickname of the first RB, determining whether the sequence number of another LSP received from the second RB within the predefined period of time is larger than the recorded sequence number; and
        if the sequence number of another LSP received from the second RB within the predefined period of time is larger than the recorded sequence number, modifying the nickname of the first RB; otherwise, keeping the nickname of the first RB unchanged.

6. The method of claim 5, after keeping the nickname of the first RB unchanged, further comprising:
    broadcasting an LSP for aging for the second RB, so that each of RBs in the TRILL network removes the LSP of the second RB from a Link State Data Base (LSDB).

7. A first routing bridge (RB) to process a nickname conflict in a TRILL network, the RB comprising:
    a processor; and
    a memory storing machine readable instructions executable by the processor to:
        receive a Link State Packet (LSP) from a second RB;
        determine, according to the received LSP, whether nicknames for the first RB and the second RB conflict;
    in response to determining that the nicknames conflict, determine whether the first RB is a lower priority RB than the second RB based on comparing information of the first RB with information determined from the LSP;
    broadcast the LSP received from the second RB in response to determining the first RB is the lower priority RB;
    modify the nickname of the first RB if the first RB receives another LSP from the second RB within a predefined period of time of receiving the LSP; and
    keep the nickname of the first RB unchanged if the first RB does not receive another LSP from the second RB within the predefined period of time.

8. The first RB of claim 7, wherein the machine readable instructions to determine whether the first RB is the lower priority RB comprise instructions to:
    determine a priority of the first RB;
    determine a priority of the second RB based on the LSP;
    compare the priorities of the first and second RBs; and
    determine the first RB is the lower priority RB if the priority of the first RB is determined to be lower than the priority of the second RB based on the comparing.

9. The first RB of claim 8, wherein the machine readable instructions comprise instructions to:
    determine whether the priorities are the same based on the comparing;
    in response to determining the priorities are the same, determine whether a system identity of the first RB is smaller than a system identity of the second RB contained in the LSP; and
    if the system identity of the first RB is smaller than the system identity of the second RB, determine that the first RB is the lower priority RB.

10. The first RB of claim 7, wherein in response to determining the nickname of the second RB is the same as the nickname of the first RB, the machine readable instructions are to determine that the nickname conflict occurs; otherwise, determine that no nickname conflict occurs.

11. The first RB of claim 10, wherein to broadcast the LSP received from the second RB, the machine readable instructions are to:

add 1 to a sequence number of the LSP received from the second RB, and broadcasting the modified LSP of the second RB;

in response to broadcasting the modified LSP of the second RB, the machine readable instructions are executable to:

record the sequence number of the broadcasted LSP;

after receiving another LSP from the second RB within the predefined period of time and before modifying the nickname of the first RB, determine whether the sequence number of another LSP received from the second RB within the predefined period of time is larger than the recorded sequence number; and if the sequence number of another LSP received from the second RB within the predefined period of time is larger than the recorded sequence number, modify the nickname of the first RB; otherwise, keeping the nickname of the first RB unchanged.

12. The first RB of claim 11, wherein after keeping the nickname of the first RB unchanged, the machine readable instructions are to:

broadcast an LSP for aging for the second RB, so that each of RBs in the TRILL network removes the LSP of the second RB from a Link State Data Base (LSDB).

* * * * *